(12) United States Patent
Thompson

(10) Patent No.: US 10,125,472 B2
(45) Date of Patent: Nov. 13, 2018

(54) DITCH FORMING IMPLEMENT

(71) Applicant: Dynamic Ditchers Inc., Dugald (CA)

(72) Inventor: Mark Christopher Thompson, Dugald (CA)

(73) Assignee: Dynamic Ditchers Inc., Dugald (CA)

( * ) Notice: Subject to any disclaimer, the term of this patent is extended or adjusted under 35 U.S.C. 154(b) by 314 days.

(21) Appl. No.: 14/953,216

(22) Filed: Nov. 27, 2015

(65) Prior Publication Data

US 2016/0153170 A1     Jun. 2, 2016

Related U.S. Application Data

(60) Provisional application No. 62/085,279, filed on Nov. 27, 2014.

(51) Int. Cl.
| E02F 5/14 | (2006.01) |
| E02F 5/02 | (2006.01) |
| A01B 1/00 | (2006.01) |
| A01D 1/00 | (2006.01) |
| A01B 59/04 | (2006.01) |
| A01B 59/043 | (2006.01) |

(52) U.S. Cl.
CPC .................. *E02F 5/14* (2013.01); *A01B 1/00* (2013.01); *A01B 59/04* (2013.01); *A01D 1/00* (2013.01); *E02F 5/027* (2013.01); *A01B 59/043* (2013.01)

(58) Field of Classification Search
CPC ....... E02F 3/18; E02F 5/08; E02F 5/02; E02F 5/14; E02F 5/282; E02F 5/027; A01B 39/04; A01B 39/085; A01B 13/00; A01B 59/04; A01B 59/043
See application file for complete search history.

(56) References Cited

U.S. PATENT DOCUMENTS

| 2,751,698 A * | 6/1956 | Brown ..................... E02F 3/083 37/352 |
| 2,798,314 A * | 7/1957 | Brite ....................... E02F 3/181 37/92 |
| 2,923,073 A * | 2/1960 | Baker ..................... E02F 3/186 37/92 |
| 3,025,618 A * | 3/1962 | Harry ...................... E02F 3/08 172/357 |
| 3,624,826 A | 11/1971 | Rogers |
| 5,113,610 A | 5/1992 | Liebrecht, Jr. |
| 5,237,761 A | 8/1993 | Nadeau et al. |
| 6,226,903 B1 | 5/2001 | Erickson |
| 6,536,140 B2 | 3/2003 | Vaags et al. |
| 7,627,964 B2 | 12/2009 | Vaags et al. |

(Continued)

*Primary Examiner* — Jessica H Lutz

(74) *Attorney, Agent, or Firm* — Ryan W. Dupuie; Ade + Company Inc.; Kyle R. Satterthwaite

(57) ABSTRACT

A ditch forming implement, for use with a working vehicle, has a frame for towing connection to the working vehicle and which supports a rotatable impeller member thereon for spreading soil in a laterally outward direction relative to a forward path of the implement. A driven pulley wheel is fixed to a rear of the impeller member for rotation together relative to the frame. A drive shaft assembly operatively transfers rotational drive from a power take-off of the working vehicle to a driven pulley wheel on the frame, to be subsequently transferred to the driven pulley wheel by a drive belt connected between the driven and drive pulley wheels.

19 Claims, 6 Drawing Sheets

(56) References Cited

U.S. PATENT DOCUMENTS

2014/0166320 A1* 6/2014 Olsen .................... A01B 33/02
      172/60
2015/0305223 A1* 10/2015 Thompson ........... A01B 49/022
      172/145
2017/0022685 A1* 1/2017 Thompson ............. E02F 5/027

* cited by examiner

DITCH FORMING IMPLEMENT

This application claims the benefit under 35 U.S.C. 119(e) of U.S. provisional application Ser. No. 62/085,279, filed Nov. 27, 2014.

FIELD OF THE INVENTION

The present invention relates to a ditch forming implement which is arranged to cut a top layer of soil from the ground as the implement is displaced along the ground in a forward working direction and which is arranged to spread the cut soil transversely to the forward working direction so as to form a ditch extending in the forward working direction.

BACKGROUND

In many situations, it is known to be desirable to remove soil from its current location and to spread the removed soil so that it does not interfere with future operations on the land. An example is where ditches are made to drain standing water from ponds on agricultural lands.

A typically ditch forming implement includes a frame arranged to be towed across the ground in a forward working direction by a tractor and which supports a impeller disc thereon for rotation about an impeller axis oriented generally in the forward working direction. A plurality of paddles on the impeller disc serve to either cut soil by directly engaging the ground or receive soil which has already been cut by a suitable ground engaging blade ahead of the disc such that the cut soil is spread laterally to one side of the implement by the spinning of the impeller disc.

Examples of various ditching implements of are described in U.S. Pat. Nos. 6,536,140 and 7,627,964 both by Vaags et al; U.S. Pat. No. 6,226,903 by Erickson, U.S. Pat. No. 5,113,610 by Liebrecht Jr; U.S. Pat. No. 5,237,761 by Nadeau et al; and U.S. Pat. No. 3,624,826 by Rogers. In each instance, the impeller disc is driven by a drive shaft that communicates between a power take-off of the working vehicle, and a gearbox on the implement frame which in turn is connected to the impeller disc. The gearbox arrangement is typically complex and costly to manufacture, and can be subject to costly repair in the event that the implement disc becomes jammed by debris.

SUMMARY OF THE INVENTION

According to one aspect of the invention there is provided a ditch forming implement for use with a working vehicle supported for movement in a forward working direction and including a hitch connection and an auxiliary drive shaft supported at a rear end of the working vehicle, the implement comprising:

a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel; and a drive belt engaged about the drive pulley wheel and the driven pulley wheel to drive rotation of the driven pulley wheel responsive to rotation of the driven pulley wheel.

The use of a drive belt is simple to manufacture and maintain, while also providing some ability to absorb sudden impacts if debris such as large stones and the like being lodged in the impeller, as compared to the exclusive use of gearboxes and universal joints used to directly drive an impeller in the prior art.

Preferably the driven pulley wheel is supported coaxially with the impeller in fixed relation therewith.

Preferably the driven pulley wheel has a diameter which is a multiple of a diameter of the drive pulley wheel. For example, the driven pulley wheel may have a diameter which is at least 30 percent a diameter of the impeller, and more preferably near 50 percent a diameter of the impeller.

Preferably the drive pulley wheel is offset laterally to one side of the frame so as to be supported on the frame at a common height with a top end of the impeller.

Preferably a gearbox is supported on the frame such that the draft shaft assembly is coupled to an input shaft of the gearbox and the drive pulley wheel is supported directly on a main output shaft of the gearbox.

Preferably the gearbox is supported on the frame laterally offset to one side of the frame and forwardly of the impeller such that the main output shaft of the gearbox spans longitudinally between the gearbox ahead of the impeller and the drive pulley wheel behind the impeller.

Preferably the implement further includes: i) a knife supported on the frame ahead of the impeller for cutting and lifting soil in the longitudinal path of the implement; ii) a kicker assembly rotatably supported on the frame above the knife and forwardly of the impeller so as to be arranged to throw the cut soil rearwardly onto the impeller; and iii) a secondary output shaft on the gearbox operatively coupled to the kicker assembly to drive rotation of the kicker assembly relative to the frame.

The impeller member is preferably supported at a fixed location relative to the frame supporting the hitch coupling thereon.

In some embodiments, the implement further includes wheels supported on the rear end of the frame so as to be arranged to support the frame for rolling movement along the ground in a towing connection to the working vehicle. In this instance, the hitch coupling on the front end of the frame is preferably arranged to connect to the hitch connection of the working vehicle so as to allow for pivotal movement of the frame of the ditch forming implement relative to the working vehicle about an upright steering axis, and the drive shaft assembly preferably includes a pair of universal joints connected in series therewith to allow for pivoting of the frame about the upright steering axis.

Alternatively, the hitch coupling on the front end of the frame may comprise a three-point hitch assembly arranged to be coupled to a corresponding three-point hitch connection on the working vehicle.

In some embodiments, the frame may further include an auxiliary coupling at the rear end which is arranged for 3 point hitch connection to the hitch connection of the working vehicle in a reverse mounting configuration in which the frame is oriented with the rear end of the frame leading the front end of the frame in the forward working direction of the working vehicle so as to be opposite to a forward mounting configuration when the hitch coupling on the frame at the front end is connected to the hitch connection of the working vehicle. When the implement further includes a knife and a kicker assembly, the knife and the kicker assembly are preferably forward of the impeller in the forward mounting configuration and in a trailing relationship with the impeller member in the forward working direction of the working vehicle in the reverse mounting configuration.

In some embodiments, the implement further includes i) a first auxiliary pulley wheel rotatably supported on the frame, forwardly of the impeller member at a laterally central location, ii) a second auxiliary pulley wheel rotatably supported on the frame forwardly of the impeller member at a location laterally offset from the first auxiliary pulley wheel, iii) an auxiliary belt operatively engaged about the first and second auxiliary pulley wheels, and iv) an auxiliary shaft assembly operatively connected between the second auxiliary pulley wheel forwardly of the impeller member and the drive pulley wheel rearwardly of the impeller member, v) wherein the drive shaft assembly is connected to the first auxiliary pulley wheel so as to be arranged to transfer drive from the auxiliary drive shaft of the working vehicle to first auxiliary pulley wheel. When the impeller further includes a knife and a kicker assembly, the auxiliary shaft assembly includes a gearbox in series between the second auxiliary pulley wheel and the drive pulley wheel and wherein the gearbox includes a secondary output shaft operatively coupled to the kicker assembly to drive rotation of the kicker assembly relative to the frame. The second auxiliary pulley wheel may be larger in diameter than the first auxiliary pulley wheel to reduce the ratio difference required between the drive pulley wheel and the driven pulley wheel.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
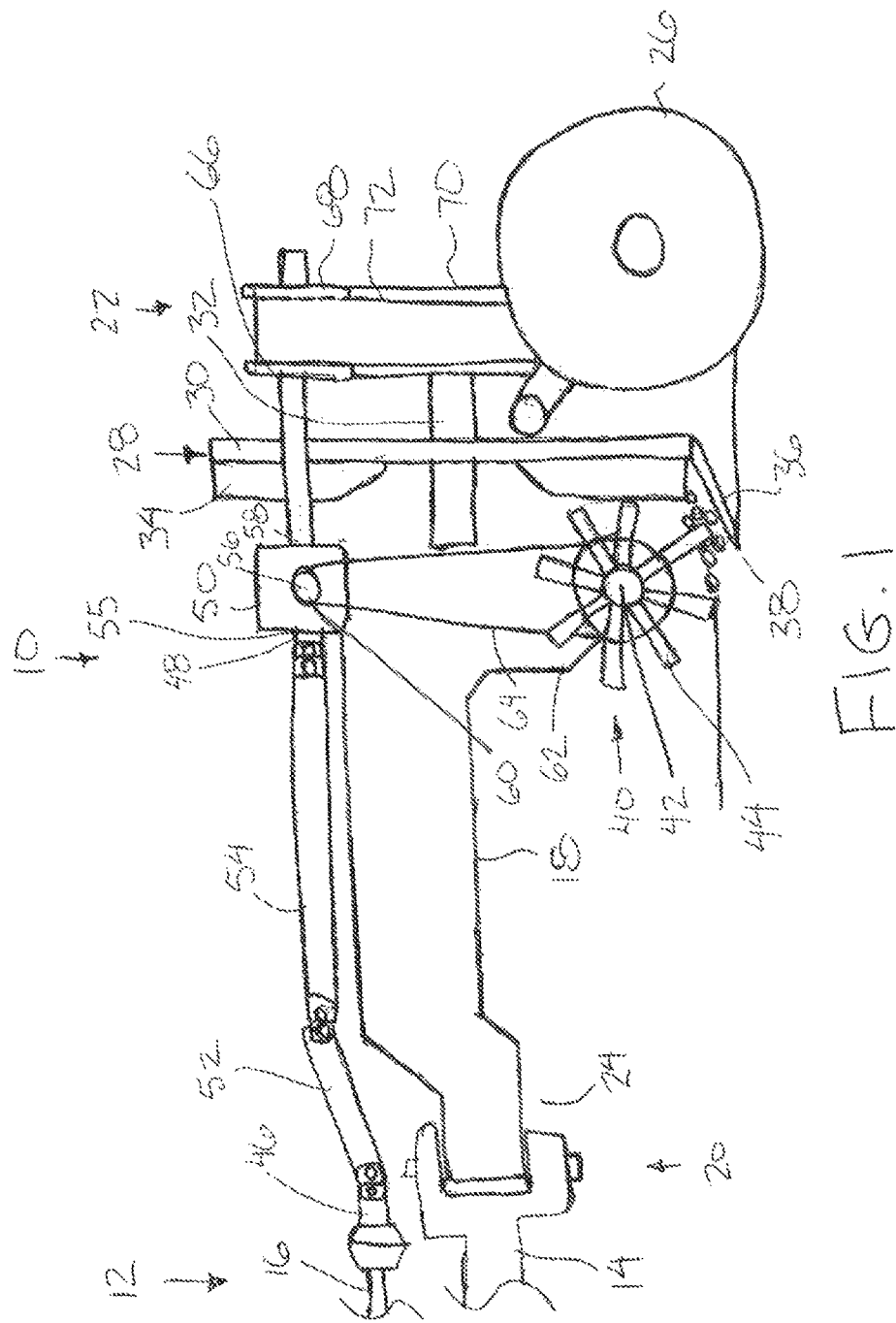
FIG. 1 is a side elevational view of the ditch forming implement.
Figure 2:
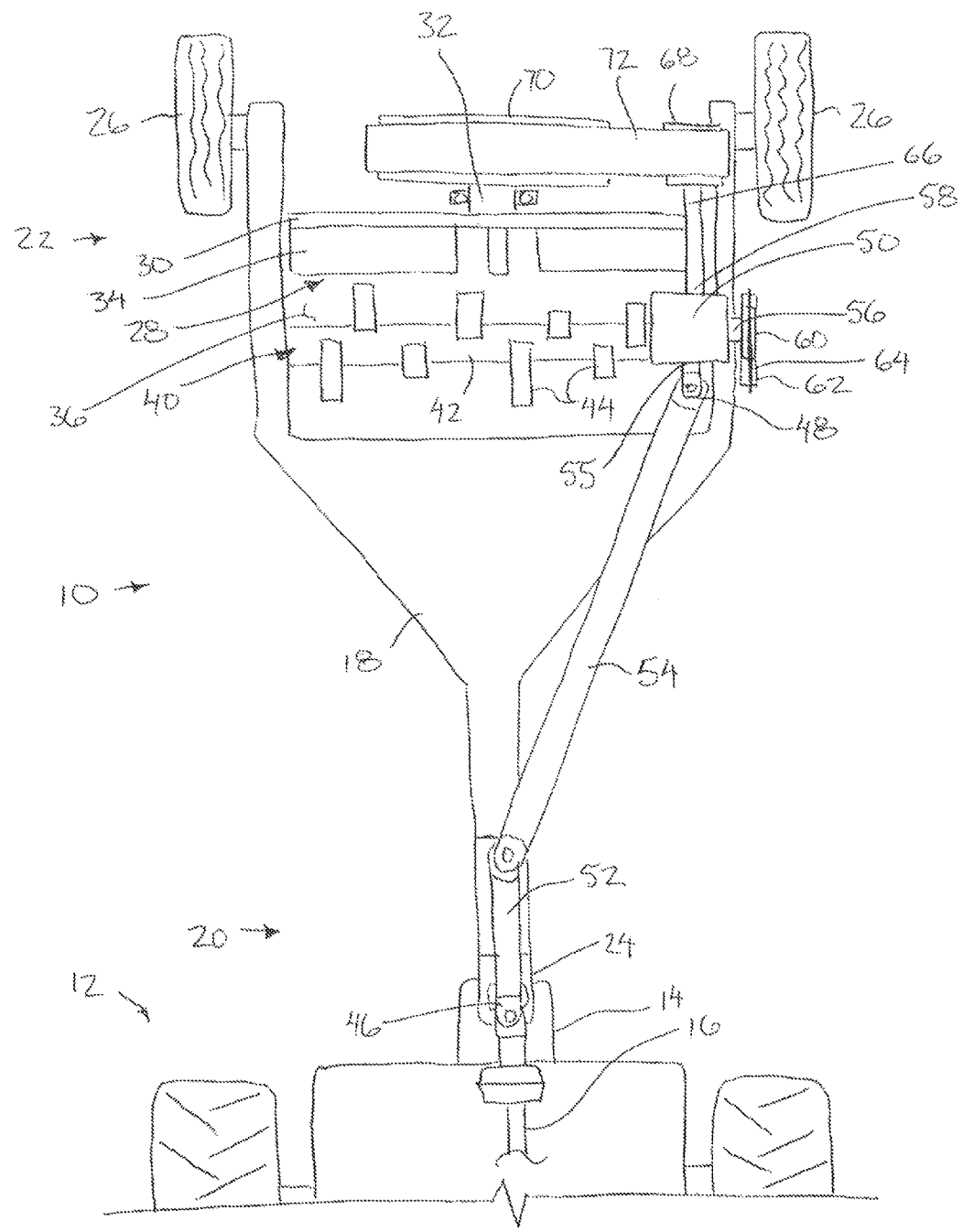
FIG. 2 is a top plan view of the ditch forming implement.
Figure 3:
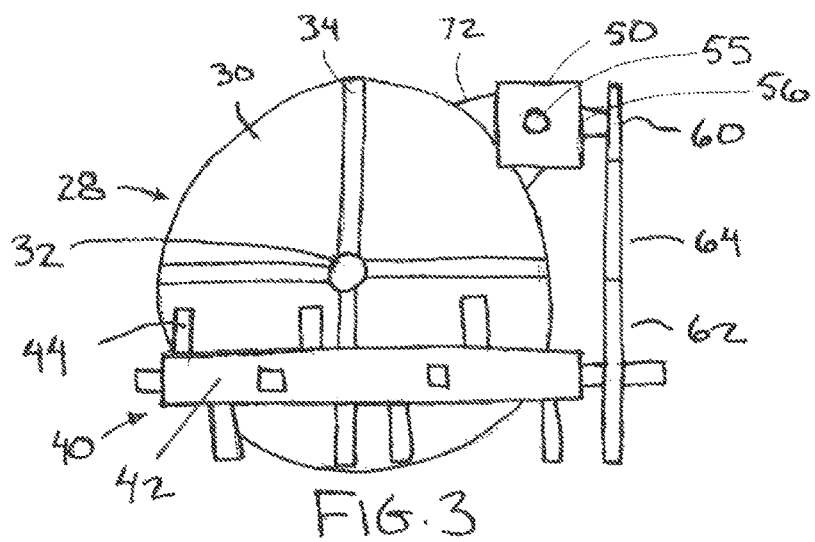
FIG. 3 is a front elevational view of the impeller of the ditch forming implement.
Figure 4:
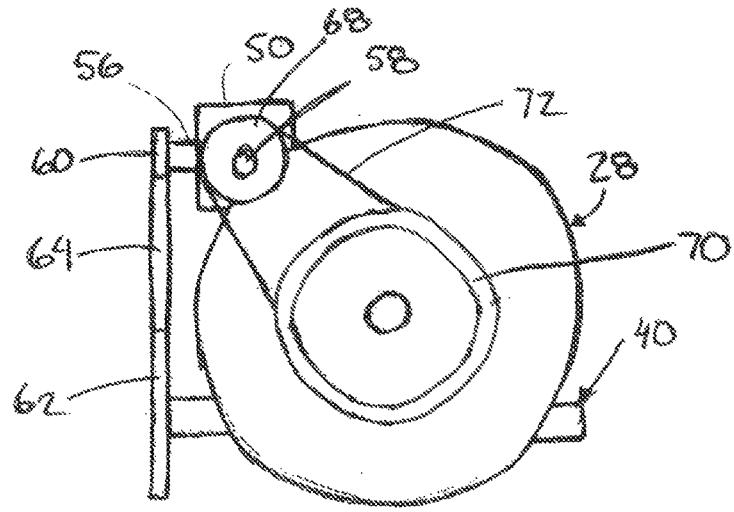
FIG. 4 is a rear elevational view of the impeller of the ditch forming implement.
Figure 5:
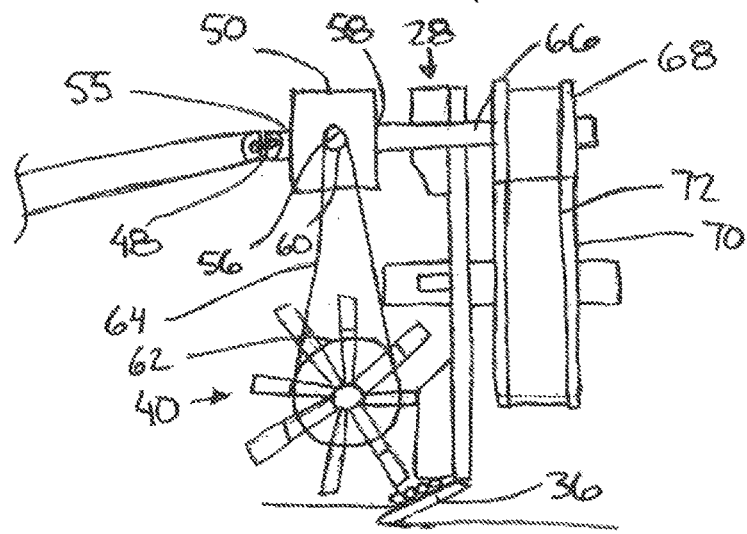
FIG. 5 is a side elevational view of the impeller of the ditch forming implement.

Referring to the accompanying figures there is illustrated a ditch forming implement generally indicated by reference numeral 10. The implement 10 is particularly suited for cutting a top layer of soil from the ground along a longitudinal path of the implement as the implement is advanced in a forward working direction across the ground and for spreading the cut soil laterally outward to one side relative to the forward working direction.

The ditch forming implement 10 is particularly suited for use with a working vehicle such as an agricultural tractor 12. Typically, the tractor is supported so as to be movable across the ground in a forward working direction. A hitch 14 is provided at the rear end of the tractor for connection to various types of implements to be towed. The tractor further includes a power take-off shaft 16 at the rear end thereof which is driven to rotate by the tractor under operator controls of the tractor.

The implement 10 includes a frame 18 extending longitudinally between a front end 20 and a rear end 22. A hitch coupling 24 is provided at the front end of the frame for suitable connection to the hitch 14 of the tractor such that the implement is arranged to be towed for movement across the ground together with the tractor in the forward working direction. In the first embodiment, the hitch coupling on the front end of the frame is arranged to connect to the hitch connection of the working vehicle so as to allow for pivotal movement of the frame of the ditch forming implement relative to the working vehicle about an upright steering axis.

In the illustrated embodiment, the frame 18 further includes a pair of wheels provided at laterally opposing sides of the frame adjacent the rear end thereof in which the wheels 26 support the rear end of the frame for rolling movement along the ground in the forward direction.

The implement further includes an impeller 28 supported rotatably upon the frame for rotation about a respective impeller axis which is oriented generally in the forward working direction. The location and orientation of the impeller remains fixed relative to the frame of the implement and relative to the hitch coupling on the frame of the implement. The impeller includes a circular disc body 30 which is supported perpendicularly to the impeller axis so as to be oriented transversely to the forward working direction. The impeller further includes a shaft 32 fixed to the disc body 30 and which is rotatably supported on the frame by suitable bearings at axially opposed ends of the shaft, for example both in front and rearward of the disc body 30.

The impeller further includes a plurality of paddles 34 supported on the forward face of the disc body 30 for rotation therewith relative to the frame. The paddles project perpendicularly outward from the forward face of the disc body and are oriented to be elongate in a radial direction such that each paddle spans generally from a central location on the disc body to the perimeter edge of the disc body. In this manner any cut soil thrown rearward onto the forward face of the disc body will be carried in a circumferential direction by the paddles 34 as the disc body is rotated. The paddles serve to throw the cut soil deposited thereon in a generally radial direction. The disc body may cooperate with a chute supported on the frame of the implement to extend circumferentially about the perimeter of a portion of the impeller body to guide the soil thrown by the impeller in a lateral direction to one side of the frame of the implement when in use.

Although in some embodiments, the impeller may directly engage the ground to cut the soil from the path of the implement, in the illustrated embodiment the implement further includes a knife 36 supported on the frame in the form of a horizontal blade spanning the full width of the impeller disc body at a location both ahead and below the disc body of the impeller. A leading face of the knife 36 is sloped upwardly and reardwardly from a leading edge 38. The leading edge 38 defines the cutting edge of the knife which engages into ground for cutting the soil from the ground and lifting the cut soil upward and rearward along the forward face of the knife as the implement is towed across the ground in a forward working direction. The rear edge of the knife is upward and forward from the bottom edge of the impeller body such that the cut soil is directed by the leading face of the knife upwardly and rearwardly into the leading side of the rotating impeller.

A kicker assembly 40 is also supported on the frame above the knife 36 and forward of the impeller 28. The kicker assembly serves to assist in throwing the soil cut and lifted by the knife rearward towards the impeller. The kicker assembly includes a horizontal shaft 42 spanning laterally substantially the full width of the frame of the implement at a location directly above and slightly ahead of the leading edge 38 of the knife. A plurality of paddles 44 extend radially outward from the shaft 42 at different circumferentially spaced positions and axially spaced positions along the shaft. The shaft 42 is supported at axially opposing ends on the frame by suitable bearings such that the paddles and the shaft are rotatable together relative to the frame with the paddles at the bottom side of the kicker assembly being rotated rearwardly towards the impeller.

The implement further includes a drive assembly which serves to drive rotation of the kicker assembly 40 and the impeller 28 using input from the PTO shaft 16 of the tractor. The drive assembly generally includes a drive shaft which communicates between a front end 46 having a suitable coupling thereon for interlocking connection with the PTO shaft 16 of the tractor and a rear end 48 which is connected to the forward input shaft 55 of a gearbox 50 supported on the frame at an intermediate location thereon.

The gearbox 50 is supported so as to be laterally offset to one side of the frame, substantially directly above one end of the kicker shaft 42 so as to be situated forwardly of the impeller disc body and at an elevation which is near the height or the elevation of the top edge of the impeller disc body.

The drive shaft includes a lead section 52 and a main section 54 interconnected between the front and rear ends from the PTO shaft 16 of the tractor to the input 55 of the gearbox 50 using suitable universal joints between the connections of the various sections. The universal joints connected in series with the drive shaft to allow for pivoting of the frame about the upright steering axis relative to the working vehicle in the first embodiment. More particularly, the lead section 52 extends generally rearward at an upward incline from the front end 46 to an intermediate location above the frame of the implement. The main section 54 is many times longer than the lead section 52 and extends rearward at a laterally outward incline from the rear end of the lead section to the input of the gearbox. The main section 54 is coupled to the gearbox by a suitable universal joint.

The gearbox 50 locates the input shaft 55 at the front side thereof such that it is rotatable about an input axis oriented in the forward working direction. The gearbox further includes a first output shaft 56 extending horizontally and laterally outward from the outer side of the gearbox relative to the implement frame so as to be offset by 90 degrees relative to the input shaft. The gearbox further includes a second output shaft 58 extending rearward from the rear side of the gear box so as to be coaxial with the input shaft 55 at the opposing front side of the gearbox.

The first output shaft 56 is used for driving rotation of the kicker shaft assembly. A first pulley wheel 60 is mounted concentrically on the first output shaft and a corresponding second pulley wheel 62 is mounted on the outer end of the kicker shaft directly below the first pulley wheel 60. The second pulley is many times larger in diameter than the first pulley wheel 60. The pulley wheels are aligned such that a suitable chain 64, or belt, can be mounted operatively about the first and second pulley wheels 60 and 62. In this manner rotation of the drive shaft corresponds to rotation of the input and output shafts of the gearbox so that the second pulley wheel and the kicker shaft upon which it is fixed are rotated relative to the frame proportional to the rotation of the first pulley wheel 60 on the first output shaft 56.

The second output shaft 58 extends longitudinally in the forward working direction from a front end at the rear side of the gear box which is forward of the impeller disc body to a rear end 66 of the shaft which is located rearward of the impeller disc body. A first pulley wheel 68 is mounted on the rear end 66 of the second output shaft 58 for rotation together. A second pulley wheel 70 is mounted on the rear end of the impeller shaft 32 in fixed relation relative to the impeller disc body so as to be rotatable together about the impeller axis. The second pulley wheel 70 is mounted rearward of the impeller body and is aligned with the first pulley wheel 68 such that a suitable drive belt 72 can be operatively connected between the first and second pulley wheels.

A diameter of the second pulley wheel 70 is several times greater than a diameter of the first pulley wheel 68 such that the diameter of the second pulley wheel is approximately 50% the diameter of the impeller body in the illustrated embodiment.

In some embodiments, the belt 72 comprises a broad flat friction belt which is engaged with the first and second pulley wheels by frictional contact therebetween. The inner surface of the belt in this instance may be flat or may include ribs formed thereon for cooperation with corresponding grooves formed in the outer surface of the pulley wheels, for example V grooves and the like. A width of the belt in the axial direction of the pulleys in this instance is relatively large and may be near to a diameter of the first pulley wheel 68 for example.

In further embodiments, the belt 72 may comprise a cogged belt include lugs protruding from the inner surface of the belt at evenly spaced positions for cooperation in an interlocking manner with suitable sockets evenly spaced about the circumference of each pulley wheel.

In operation, the implement is connected to the tractor and towed across the ground in a forward working direction. The operator controls rotation of the output shaft 16 of the tractor which in turn drives the input shaft of the gearbox by connection of the drive shaft assembly connected therebetween. This in turn drives rotation of the first and second output shafts of the gearbox which in turn drive the rotation of the kicker shaft and the impeller disc body respectively.

The belt drive of the main impeller disc body is found to be effective when the second pulley wheel is large in diameter relative to the first pulley wheel to provide a large frictional contact surface with the drive belt 72 while also providing some gear reduction. The frictional connection between the belt 72 and the second pulley wheel also provides some shock absorption in the event of debris being lodged in the impeller to minimize the likelihood of breakage of various components of the implement as compared to more positive drive connections including gears of various forms.

Figure 6:
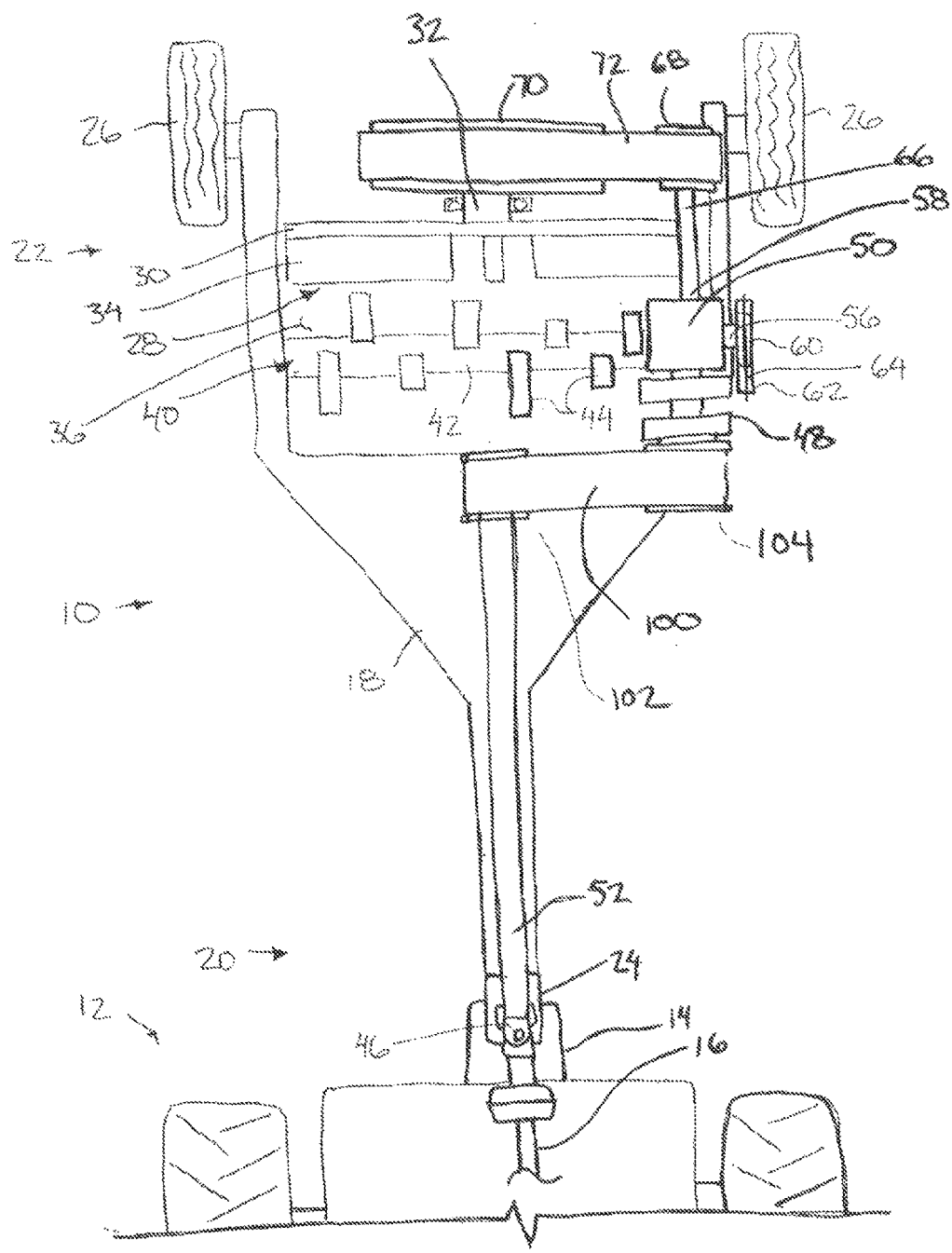
FIG. 6 is a top plan view of a second embodiment of the implement.

Turning now to FIG. 6, according to a first alternative embodiment, the drive shaft assembly may extend parallel to the forward working direction to a rear end which is laterally centered relative to the frame by providing an auxiliary drive belt 100 in communication between a first pulley wheel 102 at the rear end of the drive shaft assembly and a second pulley wheel 104 at the input shaft of the gearbox 50. In this instance some gear reduction can occur between the first and second pulley wheels 102 and 104 so as to reduce the amount of gear reduction required between the pulley wheels 68 and 70 as compared to first embodiment noted above. The pulley wheel 68 at the second output 58 of the gearbox in particular can be increased in size relative to the first embodiment to provide increased frictional gripping between the belt 72 and the pulley wheel 68. In FIG. 6, the second auxiliary pulley wheel 104 is larger in diameter than the first auxiliary pulley wheel 102.

Figure 7:
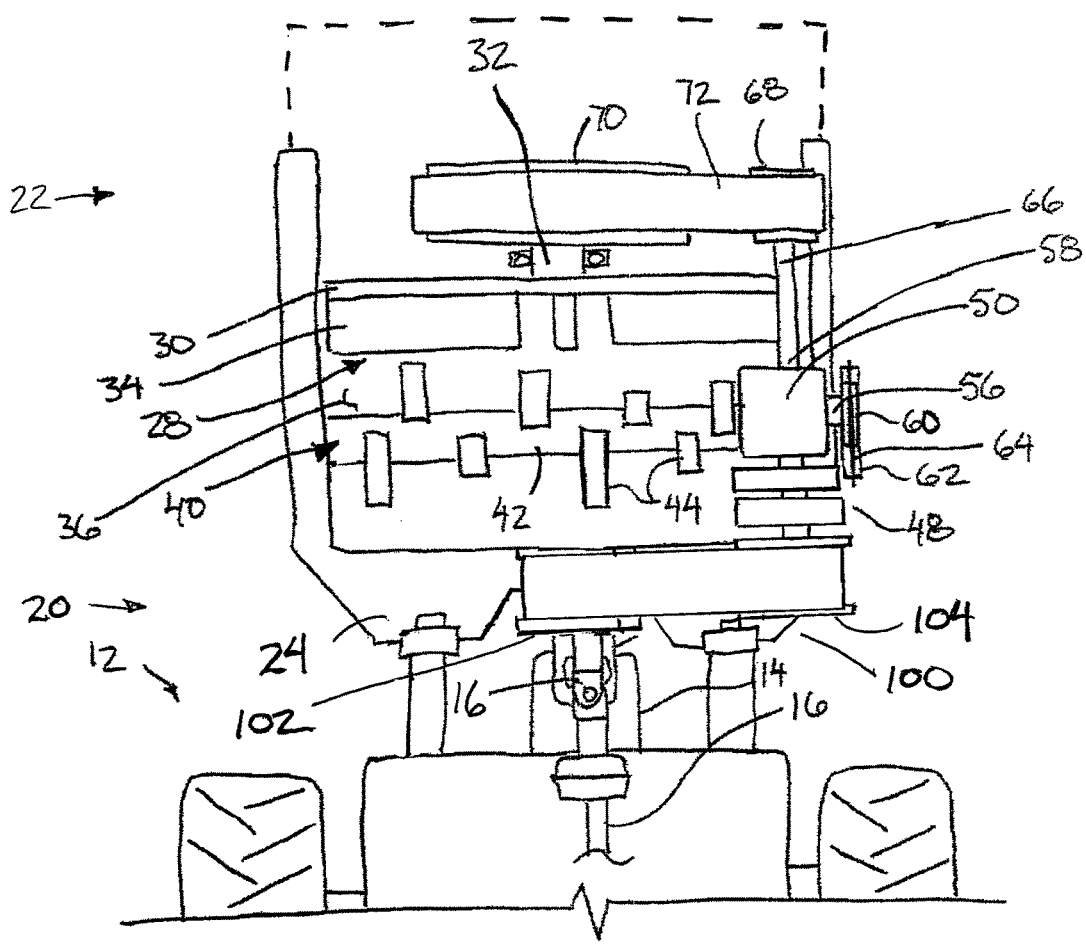
FIG. 7 is a top plan view of a third embodiment of the implement.

In another alternative embodiment shown in FIG. 7, the hitch coupling 24 at the front end of the frame may comprise a three point hitch which is suitable for connection to a three point hitch connection at the rear end of the tractor. The frame in this instance is typically modified so as to be shortly in length to permit the entirety of the frame to be supported on the three point hitch connection of the tractor such that the rear wheels 26 are no longer required. The use of a laterally centered drive shaft together with pulley wheels 102 and 104 using belt 100 as described above is particularly useful in this instance also as it is easier to shorten the drive shaft to accommodate a shorter frame in this instance as well.

Figure 8:
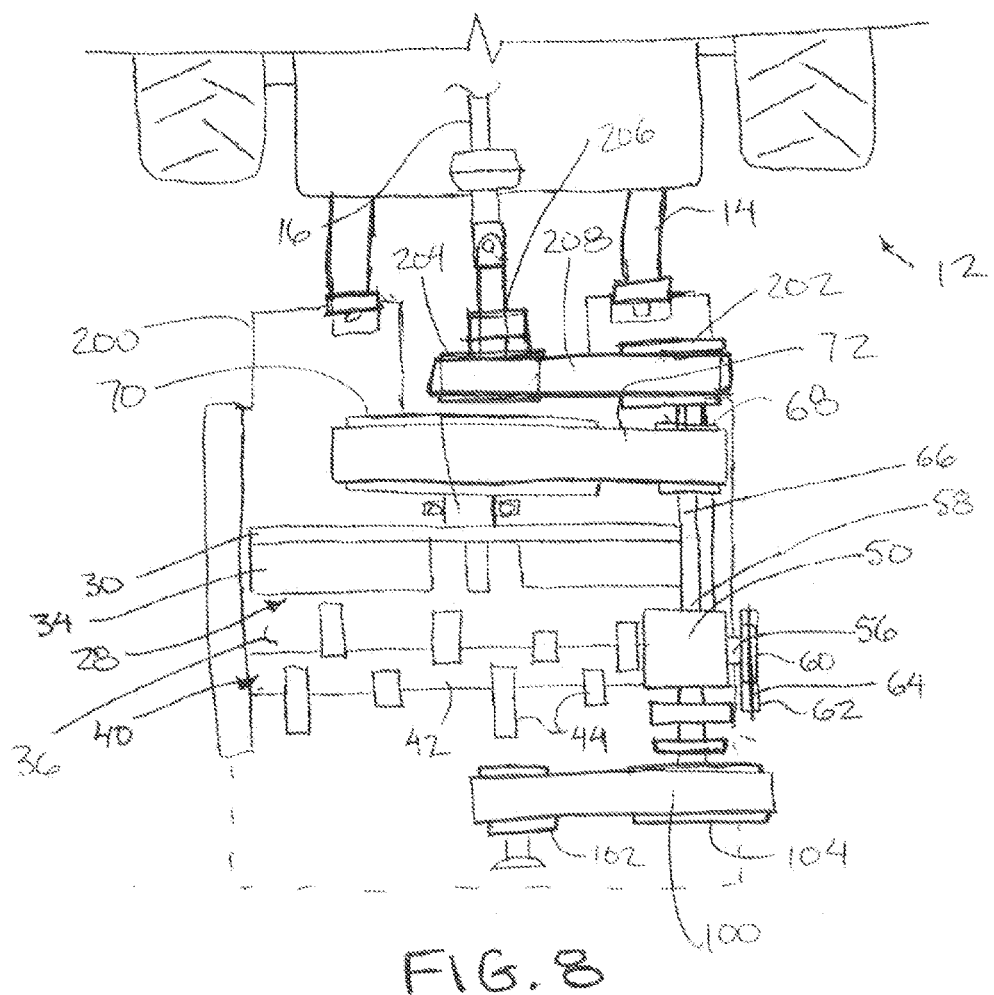
FIG. 8 is a top plan view of a fourth embodiment of the implement.

Turning now to the embodiment of FIG. 8, in this instance an additional mounting frame portion 200 may be provided at the rear end of the frame to permit the frame to be reversibly mounted on the tractor as compared to the configuration of FIG. 7. More particularly the mounting frame portion 200 is adapted to be mounted on the three point hitch connection of the tractor to entirely support implement on the three point hitch connection. The second output shaft 58 of the gearbox 50 in this instance extends through the pulley 68 to a rear end which supports a first auxiliary pulley wheel 202 thereon. The mounting frame portion 200 supports a second auxiliary pulley wheel 204 thereon having a drive shaft connection 206 connected thereto which is adapted to be connected to the PTO shaft 16 of the tractor. An auxiliary belt 208 is operatively connected between the first and second auxiliary pulley wheels. In this manner the PTO shaft 16 drives the second auxiliary pulley wheel 204 which in turn drives the first auxiliary pulley wheel 202. The first auxiliary pulley wheel 202 in turn drives the pulley wheel 68 and the corresponding shaft 58 of the gearbox 50 so that the shaft 58 acts as the input of the gearbox. The output shaft 56 of the gearbox rotates with the shaft 58 to drive the kicker assembly in the usual manner.

As shown in FIG. 8, the auxiliary coupling 200 on the frame at the rear end is thus arranged for connection to the hitch connection of the working vehicle in a reverse mounting configuration in which the frame is oriented with the rear end of the frame leading the front end of the frame in the forward working direction of the working vehicle so as to be opposite to a forward mounting configuration when the hitch coupling 24 on the frame at the front end is connected to the hitch connection of the working vehicle. When the implement also includes i) a knife supported on the frame forwardly of the impeller in the forward mounting configuration for cutting and lifting soil in the longitudinal path of the implement, and ii) a kicker assembly rotatably supported on the frame above the knife and forwardly of the impeller in the forward mounting configuration so as to be arranged to throw the cut soil rearwardly onto the impeller, the knife and the kicker will accordingly trail the impeller member in the forward working direction of the working vehicle in the reverse mounting configuration.

In this reversed orientation, the implement may be operated to clear a path by driving the tractor in the reverse direction with the implement leading the tractor. This configuration is well suited for auxiliary use of the implement as a snowblower for example.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A ditch forming implement for use with a working vehicle supported for movement in a forward working direction and including a hitch connection and an auxiliary drive shaft supported at a rear end of the working vehicle, the implement comprising:
    a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;
    an impeller member supported on the frame for rotation about an impeller axis oriented generally in the forward working direction;
    the impeller member comprising a plurality of radially oriented impeller blades arranged to spread soil from a longitudinal path of the implement in a laterally outward direction from the impeller axis as the impeller member is rotated;
    a drive pulley wheel rotatably supported on the frame rearwardly of the impeller member;
    a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;
    a driven pulley wheel supported on the frame rearwardly of the impeller member, the driven pulley wheel being operatively connected to the impeller member to drive rotation of the impeller member responsive to rotation of the driven pulley wheel the driven pulley wheel is supported coaxially with the impeller in fixed relation therewith; and
    a drive belt engaged about the drive pulley wheel and the driven pulley wheel to drive rotation of the driven pulley wheel responsive to rotation of the driven pulley wheel.

2. The implement according to claim 1 wherein the driven pulley wheel has a diameter which is a multiple of a diameter of the drive pulley wheel.

3. The implement according to claim 1 wherein the driven pulley wheel has a diameter which is at least 30 percent a diameter of the impeller.

4. The implement according to claim 1 wherein the driven pulley wheel has a diameter which is near 50 percent a diameter of the impeller.

5. The implement according to claim 1 further comprising wheels supported on the rear end of the frame so as to be arranged to support the frame for rolling movement along the ground.

6. The implement according to claim 5 wherein the hitch coupling on the front end of the frame is arranged to connect to the hitch connection of the working vehicle so as to allow for pivotal movement of the frame of the ditch forming implement relative to the working vehicle about an upright steering axis, and wherein the drive shaft assembly includes a pair of universal joints connected in series therewith to allow for pivoting of the frame about the upright steering axis.

7. The implement according to claim 1 wherein the hitch coupling on the front end of the frame comprises a three-point hitch assembly arranged to be coupled to a corresponding three-point hitch connection on the working vehicle.

8. The implement according to claim 1 wherein the impeller member is supported at a fixed location relative to the frame supporting the hitch coupling thereon.

9. The implement according to claim 1 further comprising an auxiliary coupling on the frame at the rear end which is arranged for connection to the hitch connection of the working vehicle in a reverse mounting configuration in which the frame is oriented with the rear end of the frame leading the front end of the frame in the forward working direction of the working vehicle so as to be opposite to a forward mounting configuration when the hitch coupling on the frame at the front end is connected to the hitch connection of the working vehicle.

10. The implement according to claim 9 further comprising: i) a knife supported on the frame forwardly of the impeller in the forward mounting configuration for cutting and lifting soil in the longitudinal path of the implement, and ii) a kicker assembly rotatably supported on the frame above the knife and forwardly of the impeller in the forward mounting configuration so as to be arranged to throw the cut soil rearwardly onto the impeller, wherein the knife and the kicker trail the impeller member in the forward working direction of the working vehicle in the reverse mounting configuration.

11. A ditch forming implement for use with a working vehicle supported for movement in a forward working direction and including a hitch connection and an auxiliary drive shaft supported at a rear end of the working vehicle, the implement comprising:

a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel; and a drive belt engaged about the drive pulley wheel and the driven pulley wheel to drive rotation of the driven pulley wheel responsive to rotation of the driven pulley wheel;

wherein the drive pulley wheel is offset laterally to one side of the frame.

12. A ditch forming implement for use with a working vehicle supported for movement in a forward working direction and including a hitch connection and an auxiliary drive shaft supported at a rear end of the working vehicle, the implement comprising:

a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel; and a drive belt engaged about the drive pulley wheel and the driven pulley wheel to drive rotation of the driven pulley wheel responsive to rotation of the driven pulley wheel;

wherein the drive pulley wheel is supported on the frame at a common height with a top end of the impeller.

13. A ditch forming implement for use with a working vehicle supported for movement in a forward working direction and including a hitch connection and an auxiliary drive shaft supported at a rear end of the working vehicle, the implement comprising:

a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel;

a drive belt engaged about the drive pulley wheel and the driven pulley wheel to drive rotation of the driven pulley wheel responsive to rotation of the driven pulley wheel; and a gearbox supported on the frame;

the draft shaft assembly being coupled to an input shaft of the gearbox;

the drive pulley wheel being supported directly on a main output shaft of the gearbox;

the gearbox being supported on the frame forwardly of the impeller; and the main output shaft of the gearbox spanning longitudinally between the gearbox and the drive pulley wheel which is rearward of the impeller.

14. The implement according to claim 13 wherein the gearbox is supported laterally offset to one side of the frame.

15. The implement according to claim 13 further comprising:
a knife supported on the frame ahead of the impeller for cutting and lifting soil in the longitudinal path of the implement;
a kicker assembly rotatably supported on the frame above the knife and forwardly of the impeller so as to be arranged to throw the cut soil rearwardly onto the impeller;
wherein the gearbox further includes a secondary output shaft operatively coupled to the kicker assembly to drive rotation of the kicker assembly relative to the frame.

16. A ditch forming implement for use with a working vehicle supported for movement in a forward working direction and including a hitch connection and an auxiliary drive shaft supported at a rear end of the working vehicle, the implement comprising:
a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly extending generally longitudinally between an input end arranged to be coupled to the auxiliary drive shaft of the working vehicle and an output end operatively connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel;

a drive belt engaged about the drive pulley wheel and the driven pulley wheel to drive rotation of the driven pulley wheel responsive to rotation of the driven pulley wheel;

a first auxiliary pulley wheel rotatably supported on the frame, forwardly of the impeller member at a laterally central location;

a second auxiliary pulley wheel rotatably supported on the frame forwardly of the impeller member at a location laterally offset from the first auxiliary pulley wheel;

an auxiliary belt operatively engaged about the first and second auxiliary pulley wheels; and an auxiliary shaft assembly operatively connected between the second auxiliary pulley wheel forwardly of the impeller member and the drive pulley wheel rearwardly of the impeller member;

wherein the drive shaft assembly is connected to the first auxiliary pulley wheel so as to be arranged to transfer drive from the auxiliary drive shaft of the working vehicle to first auxiliary pulley wheel.

17. The implement according to claim 16 further comprising i) a knife supported on the frame ahead of the impeller for cutting and lifting soil in the longitudinal path of the implement, and ii) a kicker assembly rotatably supported on the frame above the knife and forwardly of the impeller so as to be arranged to throw the cut soil rearwardly onto the impeller, wherein the auxiliary shaft assembly includes a gearbox in series between the second auxiliary pulley wheel and the drive pulley wheel and wherein the gearbox includes a secondary output shaft operatively coupled to the kicker assembly to drive rotation of the kicker assembly relative to the frame.

18. The implement according to claim 16 wherein the second auxiliary pulley wheel is larger in diameter than the first auxiliary pulley wheel.

19. A ditch forming implement for use with a working vehicle supported for movement in a forward working direction and including a hitch connection and an auxiliary drive shaft supported at a rear end of the working vehicle, the implement comprising:
a frame extending longitudinally between a front end and a rear end and having a hitch coupling at the front end which arranged for connection to the hitch connection of the working vehicle in a trailing configuration relative to the working vehicle so as to be arranged to follow the working vehicle in the forward working direction;

an impeller member supported on the frame for rotation about an impeller axis oriented generally in the forward working direction;

the impeller member comprising a plurality of radially oriented impeller blades arranged to spread soil from a longitudinal path of the implement in a laterally outward direction from the impeller axis as the impeller member is rotated;

a drive pulley wheel rotatably supported on the frame rearwardly of the impeller member;

a drive shaft assembly of drive shafts connected in series so as to extend generally longitudinally between an input end of the drive shaft assembly adjacent to the front end of the frame so as to be arranged to be coupled to the auxiliary drive shaft of the working vehicle and an output end that is rearward of the impeller member so as to be adjacent to the rear end of the frame, the output end being directly connected to the drive pulley wheel to drive rotation of the drive pulley wheel responsive to rotation of the auxiliary drive shaft;

a driven pulley wheel supported on the frame rearwardly of the impeller member, the driven pulley wheel being operatively connected to the impeller member to drive rotation of the impeller member responsive to rotation of the driven pulley wheel; and a drive belt engaged about the drive pulley wheel and the driven pulley wheel to drive rotation of the driven pulley wheel responsive to rotation of the driven pulley wheel.

* * * * *